United States Patent [19]

Weber et al.

[11] 4,391,344
[45] Jul. 5, 1983

[54] LOADER OPERATOR RESTRAINT

[75] Inventors: Henry J. Weber, Oaks; Lonnie D. Hoechst, Gwinner; James R. Christensen; Verne C. Watts, both of Lisbon, all of N. Dak.

[73] Assignee: Clark Equipment Company, Buchanan, Mich.

[21] Appl. No.: 228,534

[22] Filed: Jan. 26, 1981

[51] Int. Cl.³ .................. B60R 21/10; B60R 25/06
[52] U.S. Cl. .................... 180/271; 180/269; 192/129 R; 280/751; 414/699
[58] Field of Search .............. 180/268, 269, 270, 273, 180/286, 271; 280/751, 753, 748, 749, 750, 756; 414/699, 685; 192/129 R

[56] References Cited

U.S. PATENT DOCUMENTS

| 2,661,221 | 12/1953 | Lockwood et al. | 280/751 |
| 2,923,559 | 2/1960 | Owens | 280/748 |
| 3,431,995 | 3/1969 | Kiernan | 180/268 |
| 3,927,776 | 12/1975 | Steiger | 414/699 |
| 3,993,157 | 11/1976 | Schulte | 180/286 |
| 4,260,320 | 4/1981 | Steiger | 280/756 |

FOREIGN PATENT DOCUMENTS 460126 11/1913 France .................. 180/273

OTHER PUBLICATIONS

"Bobcat Loader 533, 631, 731 Europe Export Kit" Brochure, Reference No. 6561016, dated 8-80, consisting of 8 pages.
"Bobcat Loader 310, 313 Europe Export Kit" Brochure, Reference No. 6561041, undated and consisting of 9 pages.
"HMI Hydra-Mac, Inc. Model 14C" Advertisement, Undated and Consisting of 2 pages.

Primary Examiner—David M. Mitchell
Attorney, Agent, or Firm—Mack L. Thomas; Harry G. Thibault

[57] ABSTRACT

An operator restraint member having two ends is pivotally mounted at each end to a skid-steer loader. The restraint member has an engaged position for securing the operator to the operator position during operation of the loader and a disengaged position to permit the operator to enter or leave the loader. A friction device is connected to one end of the restraint member to retain the restraint member in the rotative position selected by the operator until repositioned. An automatic lock-quick release latch is connected to the other end of the restraint member for selectively locking the seat bar in its engaged position. A locking assembly is engaged with the control apparatus when the restraint member is in its disengaged position and undergoes pivotal movement to become disengaged from the control apparatus when the restraint member is in its engaged position.

17 Claims, 6 Drawing Figures

LOADER OPERATOR RESTRAINT

CROSS REFERENCES

U.S. patent applications filed simultaneously herewith, one in the names of Carman P. Lynnes et al entitled "Loader Operator Restraint System", Ser. No. 228336, filed Jan. 26, 1981, and the other in the names of Michael A. Vig et al. entitled "Operator Restraint for a Loader" Ser. No. 228,535, filed Jan. 26, 1981, both assigned to the Assignee of the present invention.

BACKGROUND OF THE INVENTION

1. Field of the Invention:

The field of art to which this invention pertains includes front end loaders and more specifically to safety features for front end loaders.

2. Description of the Prior Art:

Front end loaders often include a cab portion having an operator seat from which the loader is operated and from which the operator can control the various functions of the loader. Some types of front end loaders are expected to go over rough terrain, make sudden stops and turns and are subject to sudden tilting and lurching. Roll Over Protection Structures (ROPS) and/or seat belts are customarily provided to lower the possibility of injury during the above-described rough ride conditions. It is preferable that the operator use his seat belt under these conditions to avoid an enhanced possibility of injury or being thrown from the vehicle.

A skid-steer loader is a type of front end loader in which the operator often encounters rough ride conditions. Skid-steer loaders are commonly provided with a front entry ROPS and a seat belt.

In Hydra-Mac, Inc.'s skid-steer loader the front entry is provided with a two section gate that has a closed position for blocking the front entry and an open position where the gate sections act as obstructions in the path of the boom arms. It should be noted that the operator in this loader is prevented from being thrown from the cab portion when the gate is in its closed position but is not prevented from undue movement in the cab portion during rough ride conditions.

Another known prior art safety feature provided on skid-steer loaders is manufactured by the Assignee of the present invention and includes two types of manually actuated mechanical locks on the foot pedal linkage controlling the boom arms. Both of these mechanical locks are not connected with any other safety feature.

SUMMARY OF THE INVENTION

This invention provides safety apparatus that has a lower position that not only blocks the front entry of the front end loader but also maintains the operator in his seat and the cab during rough ride conditions. Moreover, the safety apparatus has a raised position wherein the operator is prevented from operating the hydraulics to raise or lower the boom arms of the loader. Therefore, the operator must place the safety apparatus in its lower position in order to raise or lower the boom arms of the loader.

The safety apparatus includes a seat bar which is pivotally connected at each of its two ends to the loader at opposite vertical side posts of the front opening of the cab portion of the loader. The seat bar rotates about a horizontal axis defined by the axially aligned connection points for the seat bar on the side posts. A spring biased friction device is operatively associated with the pivotal connection of the seat bar so that the seat bar remains in the rotative position selected by the operator until repositioned by the operator. Additionally, an automatic lock-quick release latch is provided for selectively retaining the seat bar in its engaged position. The latch prevents the operator from inadvertently moving the seat bar from its engaged position. When the seat bar is in its lower position the middle portion of the seat bar holds and retains the operator in the cab seat and prevents undue operator movement during rough ride conditions. When the seat bar is in its raised position operator entrance and egress is permitted from the front opening of the loader.

A locking member is provided on one side of the loader and is connected with the seat bar. The lower end of the locking member is in contact with a locking device that is by pivotal movement in selective engagement with a boom arm control linkage which operates between a foot pedal and the hydraulic control for the boom arms to lock the boom arm control linkage in a neutral position. The locking member is moved out of locking engagement with the control linkage when the seat bar is in its lowered position.

The cab portion of the loader can be tilted up and lifted away from the frame portion of the vehicle to permit ease of servicing of drive components contained in the vehicle frame. The seat bar is mounted on the cab portion of the loader and the locking member is mounted on the frame of the vehicle so that the seat bar moves with the cab portion when it is tilted up and away from the frame.

DETAILED DESCRIPTION OF THE PREFERRED EMBODIMENT

Figure 1:
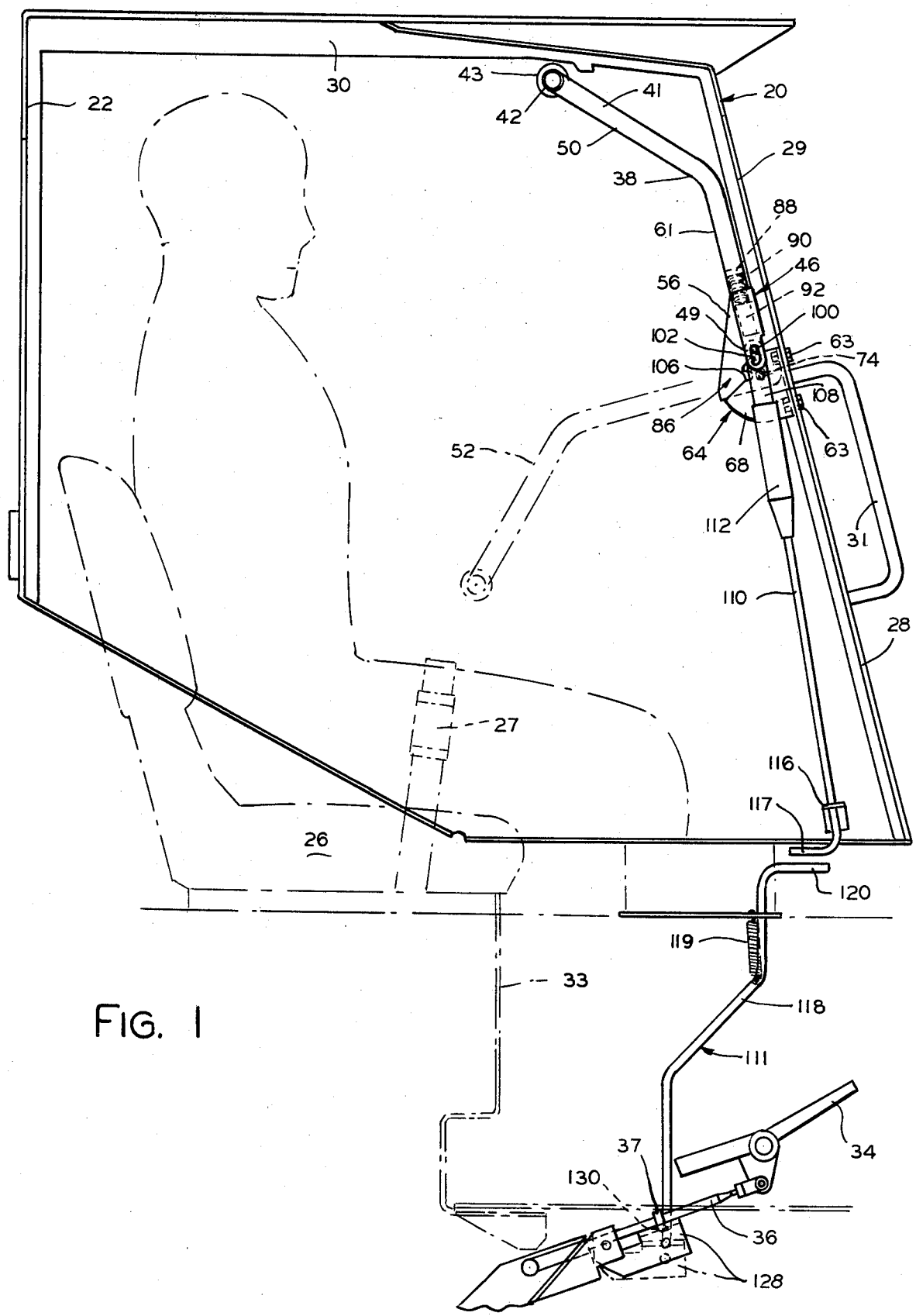
FIG. 1 is a side view of the cab portion of a skid-steer loader provided with the improvements of the present invention with parts broken away to reveal details of construction.
Figure 2:
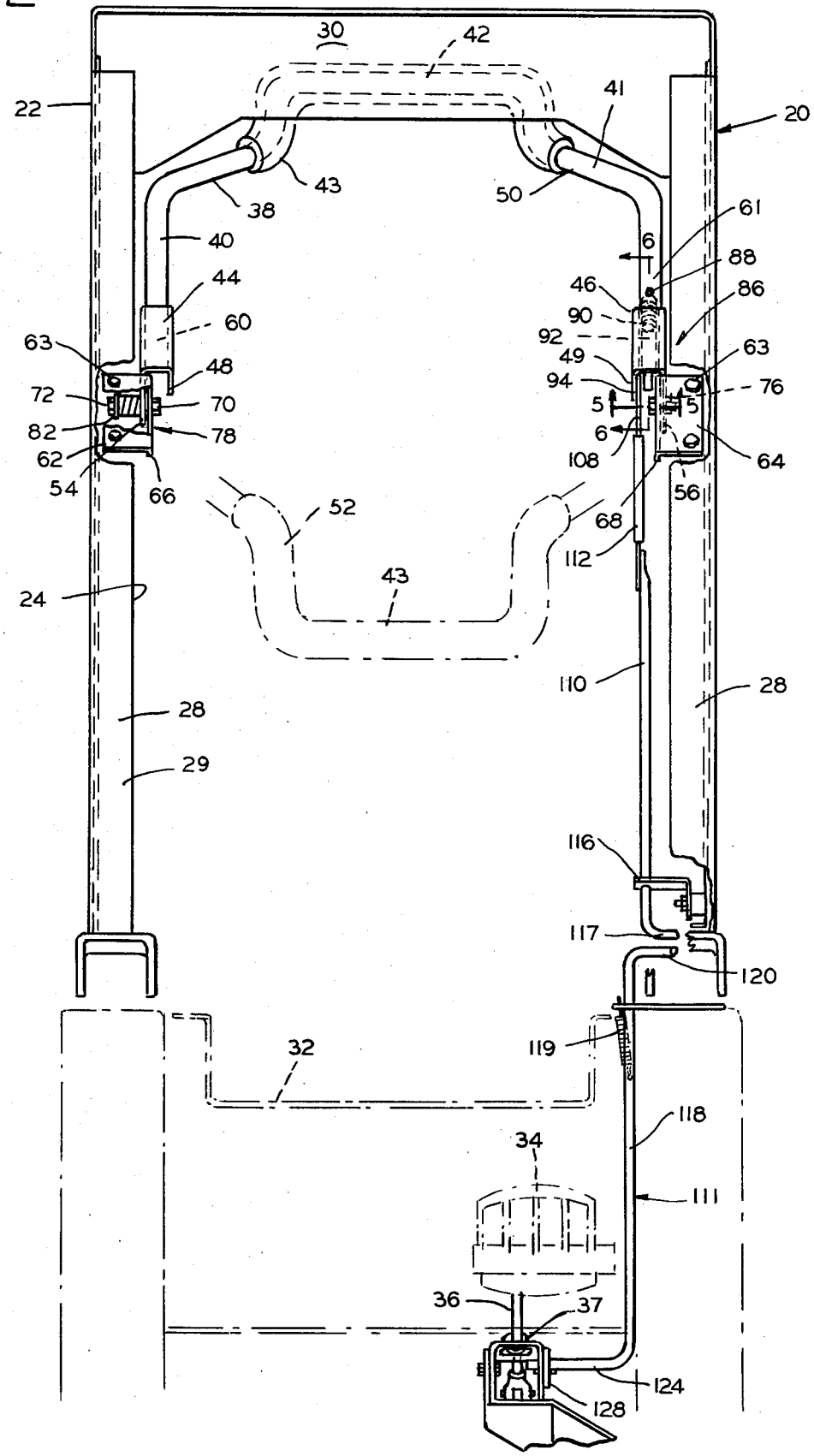
FIG. 2 is a front view of the cab portion of the skid-steer loader illustrated in FIG. 1.

A front end loader illustrated in this embodiment as a skid-steer loader 20 is shown in FIGS. 1 and 2. The skid-steer loader 20 includes a Roll Over Protection Structure (ROPS) 22 provided with a front entry and egress opening 24. The ROPS also serves as the cab portion of the skid-steer loader 20. An operator seat 26 is located inside the cab portion 20 and is provided with a seat belt 27. The front entry 24 is bounded on each vertical side by a side post 28, at the top by roof portion 30, and at the bottom by floor portion 32. Each of the side posts 28 is comprised of a plurality of side walls 29 and has en entry handle 31 to aid operator entrance.

Skid-steer loader 20 also includes a pair of conventional foot pedals 34 and associated control linkages 36. One of the control linkages 36 operates between the foot pedal and the hydraulic control (not shown) for supplying hydraulic fluid to raise and lower the boom arms in the conventional fashion. The other foot pedal 34 is connnected to its associated control linkage 36 which operates between the foot pedal and hydraulic control (also not shown) for controlling the inclination or tilt of the bucket (not shown) of the skid-steer loader 20. It should be briefly noted that the foot pedals 34 and associated control linkages 36 return to a neutral position when the foot pedal is not being depressed by the foot of the operator all in a manner well known in the prior art. A collar 37 is mounted to the control linkage 36 which supplies hydraulic fluid to the boom arms.

Figure 3:
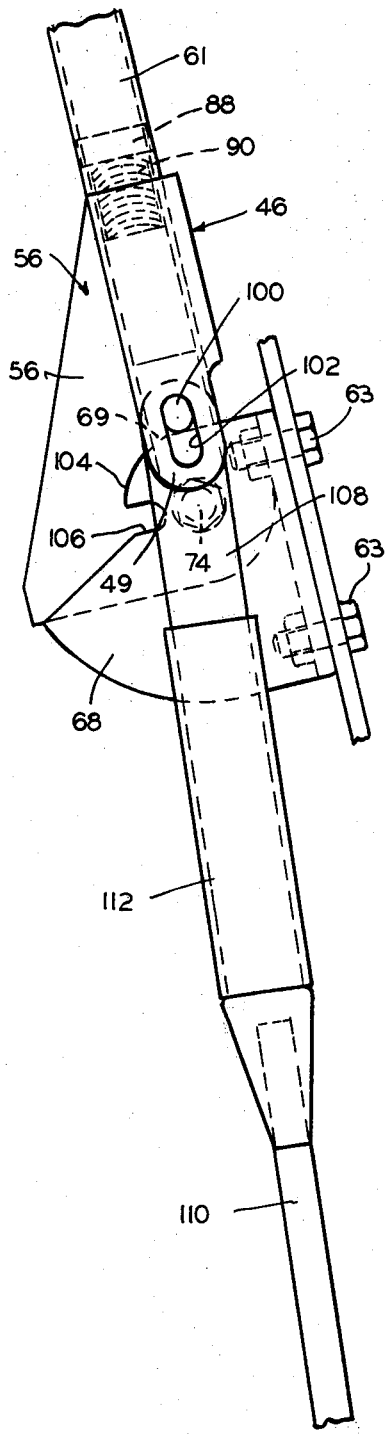
FIG. 3 is an enlarged view of the automatic lock-quick release latch shown in FIG. 1.
Figure 5:
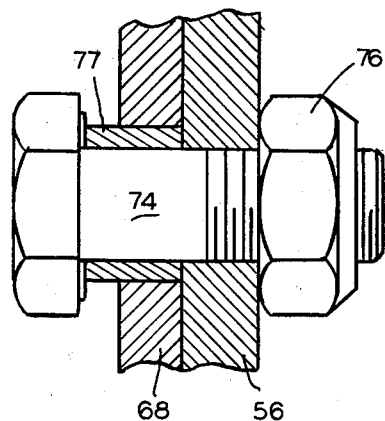
FIG. 5 is a sectional view taken on the Line 5—5 of a portion of the latch shown in FIG. 2.
Figure 6:
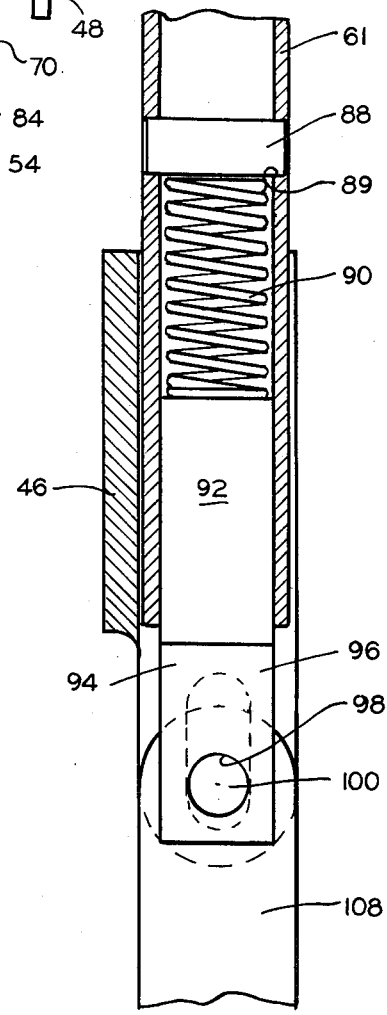
FIG. 6 is a sectional view taken on the Line 6—6 of a portion of the latch shown in FIG. 2.

A seat bar 38 shown in FIGS. 1 and 2 has a generally cylindrical configuration and includes an elongated middle portion 42 between two integrally connected end portions 40,41. As shown in FIG. 1 the seat bar 38 has a raised entry-egress position 50 shown in solid lines and a lower operator protect position 52 shown in dotted lines. The middle portion 42 of seat bar 38 encloses the operator when the seat bar is in its lowered position. The middle portion 42 has a resilient outer surface 43 for operator comfort and safety. Each end portion 40,41 of seat bar 38 has a terminal end 60,61 which is pivotally mounted to respective side posts 28 at axially aligned pivot points so that the seat bar 38 rotates about a generally horizontal axis. Each of the terminal ends 60,61 includes a respective sleeve 44,46 rigidly attached thereto. Each sleeve 44,46 includes respective inner ear portions 48,49 and respective outer mounting ear portions 54,56. Mounting ear 54 is pivotally connected by a mounting bracket 62 to front side post 28 to the right of the operator in the cab seat and to the left as viewed in FIG. 2 and similarly mounting ear 56 is pivotally connected by mounting bracket 64 to front side post 28 on the left of the operator in the cab seat 26 and to the right as viewed in FIG. 2. Fasteners 63 are provided for rigidly mounting each of the mounting brackets 62,64 to the interior of the respective side walls 29 as viewed in FIG. 2. Each bracket 62,64 has a respective ninety (90) degree angle section 66,68 having a generally rounded upper corner edge surface. The rounded edge surface 69 of angle section 68 is best shown in FIG. 3. The angle sections 66,68 are spaced apart and face each other on either side of the front entry 24 as shown in FIG. 2. The seat bar 38 is mounted onto the skid-steer loader 20 by positioning mounting ear 54 adjacent angle section 66 so that respective openings in each are in alignment so that a bolt 70 may be inserted through the aligned openings. A nut 72 is then threaded onto the terminal end of the bolt 70 to provide one of the pivot points for the seat bar mounting to the skid-steer loader 20. The other pivot point is similarly provided by aligning openings in mounting ear 56 and angle section 68, providing a tubular bushing 77 in the opening of angle section 68, inserting a bolt 74 through the opening in mounting ear 56 and through the tubular bushing 77, and securing a nut 76 to the terminal end of the bolt 74 to provide the other pivot point, see FIG. 5.

Figure 4:
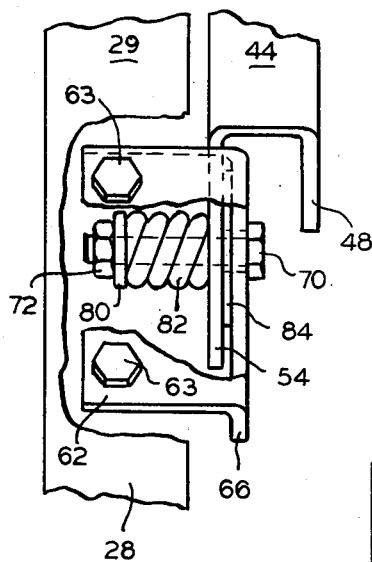
FIG. 4 is an enlarged view of the friction device shown in FIG. 2.

A friction device 78 as shown in FIGS. 2 and 4 is operatively associated with the seat bar pivot point to the right of the operator in the cab seat 26 and to the left as viewed in FIG. 2. The friction device 78 includes a washer 80 in abutment with nut 72, a coil spring 82 internally mounted on the bolt 70 spaced between the washer 80 and mounting ear 54, and a friction washer 84 having outer friction surfaces in friction contact with and sandwiched between the angle section 66 and mounting ear 54. The friction device 78 retains the seat bar 38 in the rotative position last selected by the operator until the seat bar is repositioned since the friction device provides resistance against rotational movement of the seat bar 38. The resistance provided by the friction device 78 is sufficient to withstand the force of gravity in any selected rotative position of the seat bar 38 but may easily be overcome by the operator by manual movement of the seat bar. It should be noted that this friction device is provided on only one of the pivot points for the seat bar but could easily be provided on both of the pivot points for greater resistance.

An automatic lock-quick release latch 86, as shown in FIGS. 1-3 and 6 is operatively associated with the seat bar pivot point on the left of the operator when he is in the cab seat 26 and is shown to the right in FIG. 2. The latch as shown in detail in FIGS. 3 and 6 includes a roll pin 88 horizontally disposed and mounted in opposed holes 89 in seat bar tip 61. A coil spring 90 is internally received in seat bar tip 61 and acts between the roll pin 88 and a plunger 92 partially internally received in the seat bar tip 61. The plunger 92 has an outer end 94 that projects out of seat bar tip 61. The outer end 94 of plunger 92 is reduced in diameter and has flattened opposed sides 96. The opposed flat sides 96 of the reduced plunger outer end 94 has a hole 98 therethrough. A roll pin 100 is mounted in opposed slots 102 in flap 49 and mounting ear 56 of sleeve 46. The hole 98 in the plunger outer end 94 is aligned with the longitudinal slots 102 in the flap 49 and mounting ear 56 of sleeve 46 so that roll pin 100 is also inserted through the hole 98 so that the outer end 94 of plunger 92 is spaced between the flap 49 and mounting ear 56. As shown in FIG. 3 the rounded edge surface 69 of angle section 68 is adjacent the roll pin 100 and spaced between the reduced plunger portion 94 and the mounting ear 56 as shown in FIG. 1. The roll pin 100 is in operative contact with the rounded edge surface 69 of the angle section 68 which is provided with a cam follower surface 104 as best shown in FIG. 3. The cam follower surface 104 has an inwardly disposed U-shaped lock section 106 with tapered sides for receiving and retaining the roll pin 100 when the seat bar 38 is in its engaged position. As shown in FIGS. 1, 2, 3 and 6 an elongated locking member 110 of a locking assembly 111 has a rigidly attached upper end 108 that is provided with a transverse opening that is aligned with the hole 98 in the reduced plunger outer end 94 and slots 102 in sleeve 46. Accordingly, roll pin 100 is inserted through locking member upper end 108 which is spaced between the flap 49 and reduced plunger outer end 94. Therefore, the locking member 110 is connected with the seat bar 38 and moves upwardly when the seat bar is shifted from its engaged position 52 to its disengaged position 50 and moves downwardly when the seat bar 38 is shifted from its disengaged position 50 to its engaged position 52. The locking member upper end 108 of locking assembly 111 also includes a grip section 112. The locking member 110 is received in an opening in a guide bracket 116 that is rigidly attached to the cab portion of the skid-steer loader 20. The locking member 110 is provided with a bent lower end 117.

When the seat bar 38 is moved from its disengaged position 50 to its engaged position 52 the roll pin 100 moves from the top of the bracket section 68, along the cam follower surface 104 to the cam follower surface lock section 106, see FIG. 3. In the engaged position of the seat bar 38 the tip portion 61 is in line with the cam follower lock section 106. To raise the seat bar 38 from its engaged position 52 the operator pulls the locking member grip portion 112 towards himself so that plunger 92 carrying the roll pin 100 is forced to retract into internal seat bar tip 61 and out of the cam follower surface lock section 106. The operator may then raise the seat bar 38 to its disengaged position 50.

A locking rod 118 has a bent upper end 120 in operative association with the locking member lower end 117. A spring 119 is attached to the locking rod 118 to urge it upwardly. The locking rod 118 moves downwardly from the position shown in FIGS. 1 and 2 when the locking member 110 moves in a downward direction and upwardly returns to its position shown in FIGS. 1 and 2 when the locking member 110 moves in an upward direction. The locking rod 118 has a lower bent end 124 inserted through a locking device in the form of a locking bracket 128.

The locking bracket 128 also included in locking assembly 111 is pivotally mounted on the skid-steer loader frame 33 and moves downwardly and upwardly with the lower rod end 124. The locking bracket 128 is provided with an upper locking groove 130 that receives collar 37 when the locking bracket is in its solid line lock position shown in FIG. 1. The locking bracket also has an unlocked position shown in broken lines in FIG. 1 where the locking groove 130 is spaced from the collar 37 on boom arm control linkage 36 so that the operator by manipulation of the associated foot pedal 34 may position the control linkage in any one of a number of selected operative positions for raising and lowering the boom arms. The locking bracket is pivoted away from its lock position when the locking rod moves downwardly and pivotally returns to its lock position when the locking rod is moved upwardly.

It should be noted that only one locking assembly in operative relationship with the boom arm control linkage is provided in the illustrated embodiment. However, a second locking assembly for the other control linkage could easily be provided at the other pivot point or elsewhere. Although in the present embodiment the locking bracket is connected directly to the locking rod and pivots in an upward or downward direction with the locking rod it should be understood that several different pivot points can be provided between the locking rod and locking bracket if necessary for reasons of space or design.

From the foregoing it is believed that those familiar with the art will readily recognize and appreciate the novel concepts and features of the present invention. Numerous variations, changes and substitutions of equivalents will present themselves to people skilled in the art and may be made without necessarily departing from the scope and principles of this invention. As a result, the embodiment described herein is subject to various modifications, changes and the like, with the scope of this invention being determined solely by reference to the claims appended hereto.

What is claimed is:

1. A loader including:
    a power operated working implement;
    control apparatus having a plurality of operative positions for supplying power to the working implement and at least one neutral position where power is not supplied to the working implement, the control apparatus capable of manipulation by the operator of the loader for placing the control apparatus in any one of the operative positions or the neutral position;
    an operator restraint member having an engaged position for securing the operator in the loader during operation and a disengaged position for releasing the operator to permit him to leave the loader;
    a lock assembly in operative cooperation with the control apparatus and the restraint member for locking the control apparatus in the neutral position when the restraint member is in its disengaged position, the locking assembly including a locking member connected with the restraint member, the locking member having a terminal end that is moved in a first direction when the restraint member is moved from its disengaged position to its engaged position and moved in a second direction when the restraint member is moved from its engaged position to its disengaged position, the locking assembly further including a locking device in operative association with the locking member for selective locking engagement with the control apparatus, the locking device being pivotally movable to an unlock position with the control apparatus when the terminal end of the locking member is moved in its first direction, the locking device being pivotally movable to a lock position spaced from the control apparatus when the terminal end of the locking member is moved in the second direction;
    a cab portion;
    a cab seat for the operator located in the cab portion;
    the restraint member including a generally U-shaped seat bar having two end portions and a bent center section, each of the end portions of the seat bar being pivotally connected to the cab portion at axially aligned pivot points, and the bent center section being radially displaced from an axis defined by the pivot points;
    a friction device operatively associated with one of the pivot points;
    said one pivot point including aligned openings in the cab portion and the seat bar and further including a pin inserted through the aligned openings;
    the friction device including a spring mounted on the pin and a friction washer urged by the spring into engagement with the seat bar;
    the bar including a pair of mounting ears rigidly mounted to one end of the bar and one of said mounting ears having an opening therethrough;
    the cab portion including a rigidly attached bracket mounted on a side post of the cab portion;
    the bracket having first and second sections;
    the first section mounted on the side post and the second section disposed angularly from the first section and the side post;
    said second section having an opening therethrough alignable with the opening in said one mounting ear;
    the pin being insertable through the aligned openings in said one mounting ear and the second section of the bracket; and
    the spring mounted on the pin biasing the second section and said one mounting ear together so that the bar remains in the rotative position selected by the operator until repositioned by the operator.

2. The loader as claimed in claim 1 wherein the control apparatus includes a control linkage having a collar element mounted thereon, and wherein the locking device includes a locking plate having a slot therein for selectively receiving the collar element when the locking device is in its lock position and is spaced from the collar element when the locking device is in its unlock position.

3. The loader as claimed in claim 2 wherein the locking device is pivotally mounted on the frame and wherein the locking device includes a locking rod having two ends, one of the locking rod ends being positioned for operative contact with the locking member terminal end, and the other locking rod end being connected to the locking device.

4. The loader as claimed in claims 1 wherein an automatic lock-quick release latch is operatively associated with one of the pivot points of the bar.

5. The loader as claimed in claim 4 wherein a cam follower surface is connected with the cab portion, one of the end portions of the bar being connected with a cam member capable of movement along the cam follower surface, the cam follower surface having a lock section, the cam member being positioned in the lock section of the cam follower surface when the bar is in its engaged position.

6. The loader as claimed in claim 5 wherein the cam member is in spring biased operative contact with the cam follower surface.

7. The loader as claimed in claim 6 wherein the operator can override the spring bias of the cam member to manually remove the cam member from the lock section of the cam follower surface so that the bar can be moved from its engaged position.

8. The loader as claimed in claim 7 further comprising a bracket having first and second sections rigidly attached to a side post of the cab portion and provided with the cam follower surface, and wherein the pair of spaced apart mounting ears are rigidly attached to the one end portion of the bar and wherein the mounting ears carry the cam member, and further wherein one of the pivot points includes one of the mounting ears being in abutment with the second section of the bracket, the one mounting ear and the bracket having alignable openings therein, and the pin inserted through the aligned opening in the bracket and one mounting ear.

9. A loader including:
a power operated working implement;
control apparatus having a plurality of operative positions for supplying power to the working implement and at least one neutral position where power is not supplied to the working implement, the control apparatus capable of manipulation by the operator of the loader for placing the control apparatus in any one of the operative positions or the neutral position;
an operator restraint member having an engaged position for securing the operator in the loader during operation and a disengaged position for releasing the operator to permit him to leave the loader;
a locking assembly in operative cooperation with the control apparatus and the restraint member for locking the control apparatus in the neutral position when the operator restraint member is in its disengaged position;
a cab portion;
a cab seat for the operator located in the cab portion;
the restraint member including a generally U-shaped bar having two end portions, and a bent center portion, each of the end portions being pivotally connected to the cab portion at axially aligned pivot points and the bent center portion being radially displaced from an axis defined by the pivot points;
a friction device operatively associated with one of the pivot points;
said one pivot points including aligned openings in the cab portion and the seat bar and further including a pin inserted through the aligned openings;
the friction device including a spring mounted on the pin and a friction washer urged by the spring into engagement with the seat bar;
the bar including a pair of mounting ears rigidly mounted to one end of the bar and one of said mounting ears having an opening therethrough;
the cab portion including a rigidly attached bracket mounted on a side post of the cab portion;
the bracket having first and second sections;
the first section mounted on the side post and the second section disposed angularly from the first section on the side post;
said second section having an opening therethrough alignable with the opening in said one mounting ear;
the pin being insertable through the aligned openings in said one mounting ear and the second section of the bracket; and
the spring mounted on the pin biasing the second section and said one mounting ear together so that the bar remains in the rotative position selected by the operator until repositioned by the operator.

10. The loader as claimed in claim 9 wherein an automatic lock-guick release latch is operatively associated with one of the pivot points of the bar.

11. The loader as claimed in claim 10 wherein a cam follower surface is connected with the cab portion, one of the end portions of the bar being connected with a cam member capable of movement along the cam follower surface, the cam follower surface having a lock section, the cam member being positioned in the lock section of the cam follower surface when the bar is in its engaged position.

12. The loader as claimed in claim 11 wherein the cam member is in spring biased operative contact with the cam follower surface.

13. The loader as claimed in claim 12 wherein the operator can override the spring bias of the cam member to manually remove the cam member from the lock section of the cam follower surface so that the bar can be moved from its engaged position.

14. The loader as claimed in claim 13 further comprising a bracket rigidly attached to the cab portion and provided with the cam follower surface, and wherein a pair of spaced apart mounting ears are rigidly attached to the one end portion of the bar and wherein the mounting ears carry the cam member, and further wherein one of the pivot points includes one of the mounting ears being in abutment with a section of the bracket, the one mounting ear and the bracket having alignable openings therein, and a pin for insertion through the aligned openings in the bracket and one mounting ear.

15. A loader including:
a power operated working implement;
control apparatus having a plurality of operative positions for supplying power to the working implement and at least one neutral position where power is not supplied to the working implement, the control apparatus capable of manipulation by the operator of the loader for placing the control apparatus in any one of the operative positions or the neutral position;

an operator restraint member having an engaged position for securing the operator in the loader during operation and a disengaged position for releasing the operator to permit him to leave the loader;

a locking assembly in operative cooperation with the control apparatus and the restraint member for locking the control apparatus in the neutral position when the restraint member is in its disengaged position;

a cab portion;

a cab seat for the operator located in the cab portion;

the restraint member including a bar having two end portions, each of the end portions being pivotally connected to the cab portion at axially aligned pivot points;

an automatic lock-quick release latch operatively associated with one of the pivot points of the bar;

a cam follower surface is connected with the cab portion;

one of the end portions of the bar being connected with a cam member capable of movement along the cam follower surface;

the cam follower surface having a lock section;

the cam member being positioned in the lock section of the cam follower surface when the bar is in its engaged position; and the cam member is in spring biased operative contact with the cam follower surface wherein the operator can override the spring bias of the cam member to manually remove the cam member from the lock section of the cam follower surface so that the bar can be moved from its engaged position.

16. The loader as claimed in claim 15 further comprising a bracket rigidly attached to the cab portion and provided with the cam follower surface, and wherein a pair of spaced apart mounting ears are rigidly attached to the one end portion of the bar and wherein the mounting ears carry the cam member, and further wherein one of the pivot points includes one of the mounting ears being in abutment with a section of the bracket, the one mounting ear and the bracket having alignable openings therein, and a pin for insertion through the aligned openings in the bracket and one mounting ear.

17. A loader including:

a power operated working implement;

control apparatus having a plurality of operative positions for supplying power to the working implement and at least one neutral position where power is not supplied to the working implement, the control apparatus capable of manipulation by the operator of the loader for placing the control apparatus in any one of the operative positions or the neutral position;

an operator restraint member having an engaged position for securing the operator in the loader during operation and a disengaged position for releasing the operator to permit him to leave the loader;

a locking assembly in operative cooperation with the control apparatus and the restraint member for locking the control apparatus in the neutral position when the restraint member is in its disengaged position, the locking assembly including a locking member connected with the restraint bar, the locking member having a terminal end that is moved in a first direction when the restraint member is moved from its disengaged position to its engaged position and moved in a second direction when the restraint member is moved from its engaged position to its disengaged position, the locking assembly further including a locking device in operative association with the locking member for selective locking engagement with the control apparatus, the locking device being pivotally movable to an unlock position with the control apparatus when the terminal end of the locking member is moved in its first direction, the locking device being pivotally movable to a lock position spaced from the control apparatus when the terminal end of the locking member is moved in the second direction;

a cab portion;

a cab seat for the operator located in the cab portion;

the restraint member including a bar having two end portions, each of the end portions being pivotally connected to the cab portion at axially aligned pivot points;

a friction device operatively associated with one of the pivot points, said one pivot point including aligned openings in the cab portion and the seat bar and further including a pin inserted through the aligned openings;

the friction device including a spring mounted on the pin and a friction washer urged by the spring into engagement with the seat bar;

the bar including a pair of mounting ears rigidly mounted to one end of the bar and one of the mounting ears having an opening therethrough;

the cab portion including a rigidly attached bracket mounted on a seat post of the cab portion;

the bracket having first and second sections;

the first section mounted on the side post and the second section disposed angularly from the first section and the side post;

said second section having an opening therethrough alignable with the opening in the said one mounting ear;

the pin being insertable through the aligned openings in said one mounting ear and the second bracket;

the spring mounted on the pin biasing the second section and said one mounting ear together so that the bar remains in the rotative position selected by the operator until repositioned; and an automatic lock-quick release latch operatively associated with one of the pivot points of the bar.

* * * * *